US008447069B2

United States Patent
Huang et al.

(10) Patent No.: US 8,447,069 B2
(45) Date of Patent: May 21, 2013

(54) APPARATUS AND METHOD FOR MOVING OBJECT DETECTION

(75) Inventors: Chung-Hsien Huang, Tainan (TW); Cheng-Chuan Chou, Kaohsiung (TW); Yi-Ta Wu, Taipei (TW); Chao-Hung Kao, Hsinchu (TW); Ming-Yu Shih, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 748 days.

(21) Appl. No.: 12/702,312

(22) Filed: Feb. 9, 2010

(65) Prior Publication Data

US 2011/0142283 A1 Jun. 16, 2011

(30) Foreign Application Priority Data

Dec. 10, 2009 (TW) .............................. 98142325 A

(51) Int. Cl.
*G06K 9/00* (2006.01)
(52) U.S. Cl.
USPC ......................................................... 382/103
(58) Field of Classification Search
None
See application file for complete search history.

(56) References Cited

U.S. PATENT DOCUMENTS

| 7,136,506 | B2 | 11/2006 | Howard |
| 2003/0202605 | A1 | 10/2003 | Hazra et al. |
| 2004/0091170 | A1* | 5/2004 | Cornog et al. ................ 382/276 |
| 2007/0250260 | A1 | 10/2007 | Ariyur et al. |
| 2007/0268364 | A1 | 11/2007 | Neff et al. |
| 2008/0273751 | A1* | 11/2008 | Yuan et al. ..................... 382/103 |
| 2009/0022366 | A1 | 1/2009 | Hampapur et al. |
| 2011/0002532 | A1* | 1/2011 | Frakes et al. .................. 382/154 |

FOREIGN PATENT DOCUMENTS

| CN | 101087413 A | 12/2007 |
| TW | 200820099 A | 5/2008 |
| TW | 200823800 | 6/2008 |
| TW | 200917852 A | 4/2009 |

OTHER PUBLICATIONS

C. Stauffer, and W. E. L. Grimson, "Adaptive Background Mixture Models for Real-time Tracking," in Proceedings of the IEEE Computer Vision Pattern Recognition, vol. 2, pp. 246-252, Jun. 23, 1999.
S. M. Desa and Q. A. Salih, "Image subtraction for real time moving object extraction," in Proceedings of the International Conference on Computer Graphics, Imaging and Visualization, pp. 41-45, Jul. 24, 2004.
I. Cohen and G. Medioni, "Detecting and Tracking Moving Objects in Video from an Airborne Observer," in Proceedings of Image Understanding Workshop, Nov. 1998.
I. Cohen and G. Medioni, "Detecting and Tracking Moving Objects for Video Surveillance," in Proceedings of International Conference on Computer Vision and Pattern Recognition, vol. 2, pp. 2319-2325, Jun. 23, 1999.

(Continued)

*Primary Examiner* — Claire X Wang

(57) ABSTRACT

An apparatus and method for moving object detection computes a corresponding frame difference for every two successive image frames of a moving object, and segments a current image frame of the two successive image frames into a plurality of homogeneous regions. At least a candidate region is further detected from the plurality of homogeneous regions. The system gradually merges the computed frame differences via a morphing-based technology and fuses the merged frame difference with the at least a candidate region, thereby obtaining the location and a complete outline of the moving object.

23 Claims, 18 Drawing Sheets

OTHER PUBLICATIONS

P. O. Arambel, J. Silver, M. Antone and T. Strat, "Signature-Aided Air-to-Ground Video Tracking," in Proceedings of International Conference on Information Fusion, Jul. 10, 2006.

S. Ali and M. Shah, "COCOA—Tracking in Aerial Imagery, SPIE Airborne Intelligence," in Proceedings of International Conference on Surveillance, Reconnaissance (ISR) Systems and Applications, Orlando, Apr. 19, 2006.

S. Ali, V. Reilly and M. Shah, "Motion and Appearance Contexts for Tracking and Re-Acquiring Targets in Aerial Videos," in Proceedings of International Conference on Computer Vision and Pattern Recognition, Jun. 17, 2007.

T. Mauther, M. Donoser and H. Bischof, "Robust Tracking and Spatial Related Components," in Proceedings of International Conference on Computer Vision and Pattern Recognition, Dec. 8, 2008.

A. P. Brown, K. J. Sullivan and D. J. Miller, "Feature-Aided Multiple Target Tracking in the Image Plane," in Proceedings of the SPIE, vol. 6229, pp. 62290Q, Jun. 2006.

J. Xiao, C. Yang, F. Han and H. Cheng, "Vehicle and Person Tracking in UAV Videos," in Proceedings of Multimodal Technologies for Perception of Humans: International Evaluation Workshops, pp. 203-214, May 8, 2007.

Y.-C. Chung and Z. He, "Low-Complexity and Reliable Moving Objects Detection and Tracking for Aerial Video Surveillance with Small UAVS," IEEE International Symposium on Circuits and Systems, pp. 2670-2673, May 27, 2007.

W. Koch, J. Koller and M. Ulmke, "Ground Target Tracking and Road Map Extraction," Journal of Photogrammetry & Remote Sensing (ISPRS), vol. 61, pp. 197-208, Dec. 2006.

Yi-Ta Wu, Wen-Hao Wang, Tsung-Chan Lee, "A Noise-Proof Based Image Segmentation Algorithm," in Proceedings of the 22th IPPR Confrence on Computer Vision, Graphics, and Image Processing, Aug. 23, 2009.

R. E. Kalman, "A new approach to linear filtering and prediction problems," Journal of Basic Engineering, vol. 82, No .1, pp. 35-45, 1960.

F. Orderud, "Comparison of kalman filter estimation approaches for state space models with nonlinear measurements," in proceedings of Scandinavian Conference on simulation and modeling, Oct. 13, 2005.

M. Isard and A. Blake, "Condensation—conditional density propagation for visual tracking," International Journal of Computer Vision, vol. 29, No. 1, pp. 5-28, 1998.

H. P. Moravec, "Towards automatic visual obstacle avoidance," in Proceedings of the 5th International Joint Conference on Artificial Intelligence, pp. 584. Aug. 1977.

Taiwan Patent Office, Notice of Allowance, Patent Application Serial No. TW098142325, Feb. 25, 2013, Taiwan.

* cited by examiner

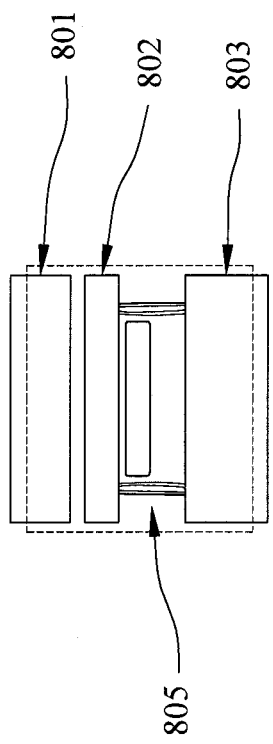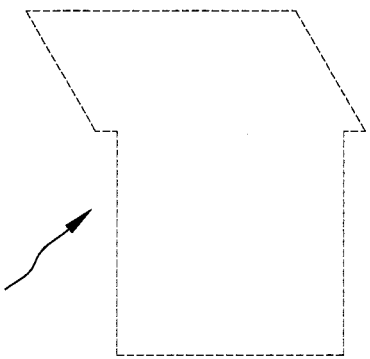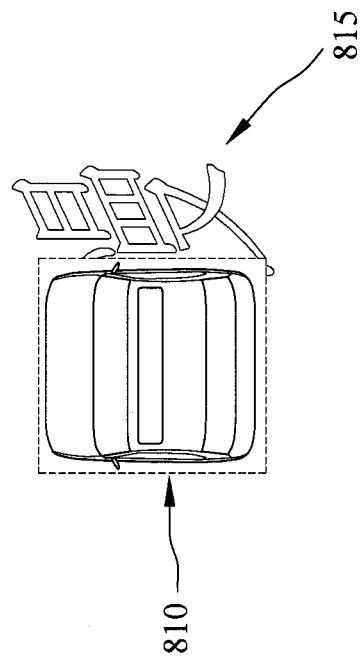
FIG. 8A
FIG. 8B

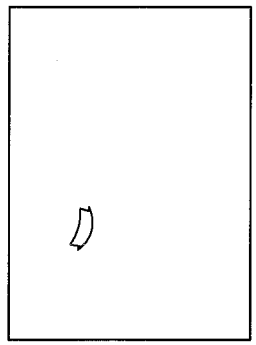
FIG. 12C
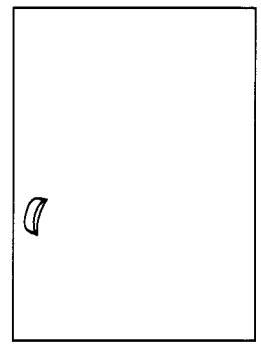
FIG. 12F
FIG. 12B
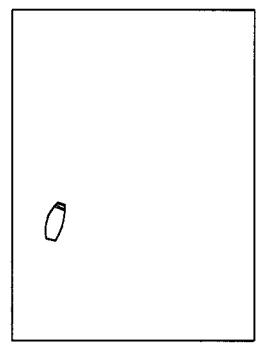
FIG. 12E
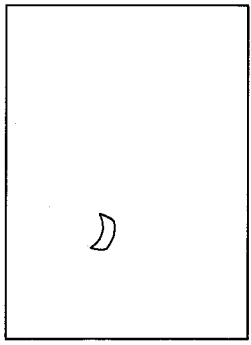
FIG. 12A
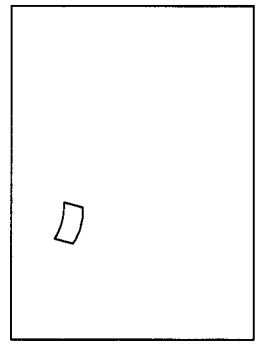
FIG. 12D

|  | $T\_1$ | $T\_2$ | ... | $T\_m$ | $CM\_r$ |
|---|---|---|---|---|---|
| $O\_1$ | 1 | 0 | ... | 1 | 2 |
| $O\_2$ | 0 | 1 | ... | 0 | 1 |
| ... | ... | ... | ... | ... | ... |
| $O\_n$ | 0 | 1 | ... | 0 | 1 |
| $CM\_c$ | 1 | 2 | ... | 1 |  |

FIG. 17A

| Correlation Value | Event |
|---|---|
| $CM\_r>1$ | Splitting |
| $CM\_r=0$ | Disappearing |
| $CM\_c>1$ | Merging |
| $CM\_c=0$ | Addition |
| $CM\_r=CM\_c=1$ | Steady Tracking |

FIG. 17B

APPARATUS AND METHOD FOR MOVING OBJECT DETECTION

TECHNICAL FIELD

The disclosure generally relates to an apparatus and method for moving object detection.

BACKGROUND

Surveillance systems often include stationary camera around the monitored scene for surveillance. When analyzing the images, technologies, such as, background subtraction or frame difference, are used to remove the background and detect the moving foreground. When the camera is installed on a moving vehicle, the processing and analysis of the captured images will encounter the problems of continuously changing background, small moving object relative to wide region, slow relative moving speed, and so on. This also complicates the aerial image of moving object detection in comparison with stationary camera.

Related researches are developed to use automatic intelligent visual surveillance technology in the future city and battlefield, where the moving object detection is based on the affine warping technology to make successive input images to achieve mutual registration. After image stabilization, the technology computes the normal flow of two successive stabilized images to detect the moving object. Also, the 4-connectivity connected component labeling technology is used to label moving object, and the attributes, such as, location of mass center, axial direction and length, of labeled object in each image are taken into account to compute the similarity and correlation of the objects in neighboring images for tracking moving object.

Moving object detection methods may be divided into optical flow method and frame difference method. The optical flow method is to differentiate moving object from the background by computing displacement of each pixel of image along the time and comparing the dominant motion and local motion. When the object or the background is larger and more uniform, the optical flow of the image frame is difficult to compute. The frame difference method is to compute frame differences to differentiate the moving object from the background after aligning neighboring images. When the object has uniform color and larger in size, it is easy to obtain fragmented result.

There are many prior arts for moving object detection. For example, Taiwan Patent Publication No. 200823800 discloses a method for dividing video object. As shown in the exemplary flowchart of FIG. 1, the video object division method is to compute the corresponding pixel difference of pixels of a current image $F_n$ and the pixels of a previous image $F_{n-1}$, then uses the difference and the pixel to execute multi-level background registration to extract a background $B_n$, and then uses background $B_n$ to remove the background region of the image. Finally, by using the background $B_{n'}$ with removed brightness average to remove the background region of the image $F_{n'}$ with removed brightness average, the method may obtain the foreground image.

As shown in the exemplary flowchart of FIG. 2, China Patent Publication CN101087413 discloses a method for dividing the moving object in video sequence. The method is to perform frame difference between the current image and the previous image, and computes statistic analysis. Combined with edge detection result, the moving object profile can be obtained. Then, the horizontal and vertical filling method is used to detect moving object. This division method is applicable to the detection of a single moving object.

Moving object tracking methods may be divided into three types. The first type is to track by using KLT tracker to associate the objects in the neighboring images. The second type is to compute the appearance and motion characteristics of the object, or to determine the correlation of the moving objects in neighboring images through setting a threshold, or based on multiple hypo thesis tracker (MHT) or joint probability data correlation (JPDA), and takes the characteristics of a plurality of moving objects in the image into account to compute the optimal match probability. The third type is to use filter technology, such as particle filter, to execute moving object tracking.

The conventional moving object tracking technology, such as U.S. Patent Publication No. 2007/0250260, discloses a method and system for autonomous tracking of a mobile target by an unmanned aerial vehicle. As shown in the exemplary embodiment of FIG. 3, aerial tracking system 300 uses an aircraft vehicle 312 carrying sensor 314 to autonomously track ground moving vehicles 310. Aerial tracking system 300 models the motion mode of both ground moving vehicle 310 and aircraft, aided by prediction and update capability of Kalman filter to track ground moving vehicle 310, where field of view (FOV) projected by sensor 314 has a ground FOV circle 320, and the angle of view of sensor 314 is equal to conic angle θ of the cone vertically beneath aircraft vehicle 312.

U.S. Pat. No. 7,136,506 disclosed a video correlation tracking system, by comparing the correlation of the image patch in successive images as a base for moving object tracking, where the user sets the location and the range of the object to be tracked in the initial image. U.S. Patent Publication No. US2009/0022366 disclosed an image analysis system. The image comes from a non-static camera, and the system uses a camera with a fixed searching path to monitor a wide area, uses image concatenation to construct the full image and uses background subtraction technique to detect moving object.

U.S. Patent Publication No. 2007/0268364 disclosed a moving object detection system, targeting successive images to perform image alignment and then computing the motion similarity of the pixels in the image. If the area with consistent motion similarity matches the size of the object, the area is determined to be moving object. The moving object obtained by this system may not have a complete outline.

SUMMARY

The exemplary embodiments of the disclosure may provide an apparatus and method for moving object detection.

In an exemplary embodiment, the disclosed relates to an apparatus for moving object detection. The moving object detection apparatus comprises a frame difference module, a candidate search module, and a moving object fusion module. The frame difference module computes the frame difference corresponding to two successive images of a moving object for a current image and a previous image. The candidate search module segments the current frame into a plurality of homogeneous regions, determines a plurality of uniform blocks from the segmented homogeneous regions, and then detects at least a candidate region from the uniform blocks. The moving object fusion module fuses the frame difference with the at least a candidate region, aided by a gradual morphing-based technology to obtain the location and a complete outline of the moving object.

In another exemplary embodiment, the disclosed relates to a method for moving object detection. The method comprises: computing the frame difference corresponding to two successive images of a moving object for a current image and a previous image; segmenting the current frame into a plurality of homogeneous regions, determining a plurality of uniform blocks from the segmented homogeneous regions, and then detecting at least a candidate region from a plurality of uniform blocks; fusing the frame difference with the at least a candidate region, aided by a gradual morphing-based technology to obtain the location and a complete outline of the moving object.

In yet another exemplary embodiment, the disclosed relates to a computer program product. The computer program product includes at least a program storage, and a program of instructions. The at least a storage can be a storage accessible by a digital processing apparatus (DPA). The program of the instructions is stored in the program storage and can be executed in the DPA to perform a moving object detection method. The method includes the steps of: targeting at two successive images of a moving object to use the current image and the previous image to compute the frame difference corresponding to the two successive images; segmenting the current frame into a plurality of homogeneous regions, determining a plurality of uniform blocks from the segmented regions, and then detecting at least a candidate region from uniform blocks; fusing the frame difference with the at least a candidate region, aided by a gradual morphing-based technology to obtain the location and complete outline of the moving object.

The foregoing and other features and aspects of the exemplary embodiments will become better understood from a careful reading of a detailed description provided herein below with appropriate reference to the accompanying drawings.

BRIEF DESCRIPTION OF THE DRAWINGS

FIG. 8B shows an exemplary schematic view of a candidate region having more than a physical object, consistent with certain disclosed embodiments.

FIG. 8B shows an exemplary schematic view of candidate region having more than a physical object, consistent with certain disclosed embodiments.

FIG. 12A and FIG. 12F show exemplary schematic views of a source image and a destination image respectively, and FIGS. 12B-12E show schematic views of intermediate images generated by gradual morphing technique, consistent with certain disclosed embodiments.

FIG. 17A shows a schematic view of an exemplary correlation matrix between moving object hypothesis and foreground detection rectangle, consistent with certain disclosed embodiments.

FIG. 17B shows a schematic view of an exemplary correlation matrix and event analysis processing, consistent with certain disclosed embodiments.

DETAILED DESCRIPTION OF THE EXEMPLARY EMBODIMENTS

The disclosed exemplary embodiments target at successive images and are based on frame difference and image segmentation technologies as well as morphing-based technology to automatically and completely detect the location and the outline of a moving object. In addition, the exemplary embodiments may collaborate with moving object tracking technology to eliminate false alarm information and uses the prediction and rectification to obtain stable and accurate moving object detection result. The following describes the exemplary embodiments in details.

Figure 1:
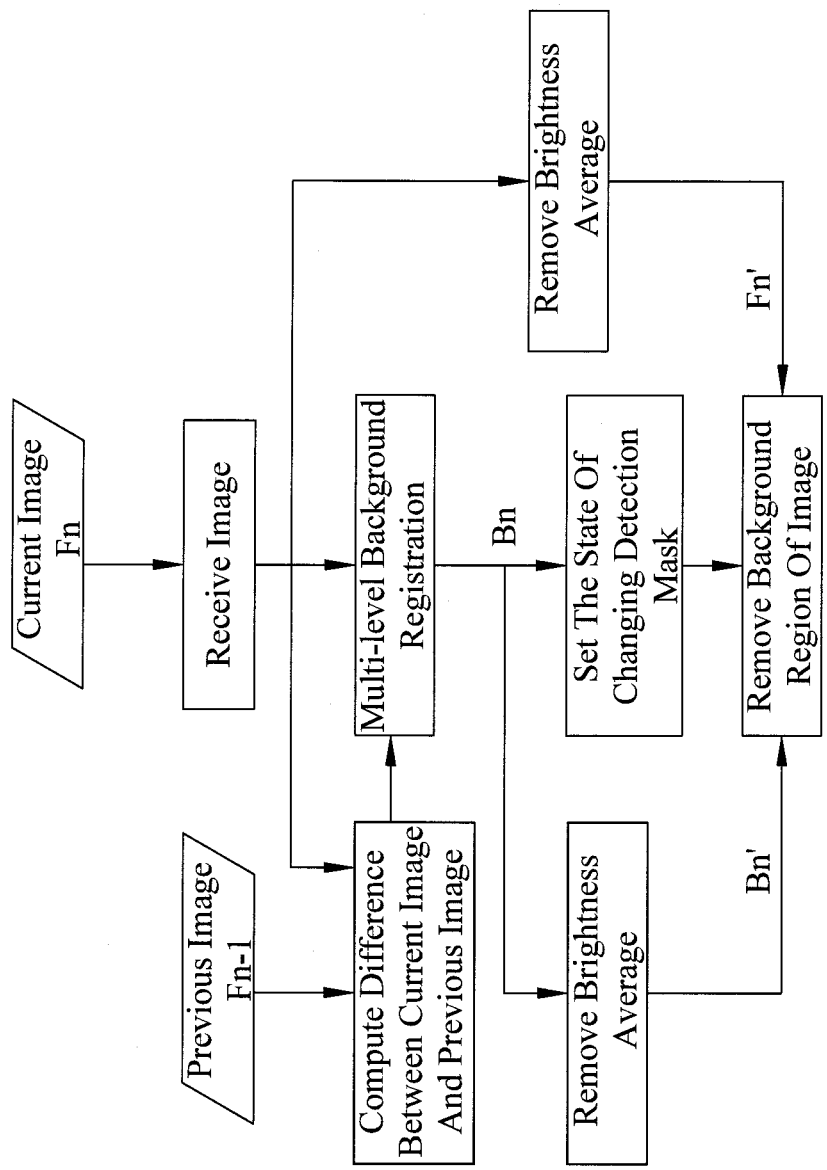
FIG. 1 shows a schematic view of an exemplary flowchart of a video object segmentation method.
Figure 2:
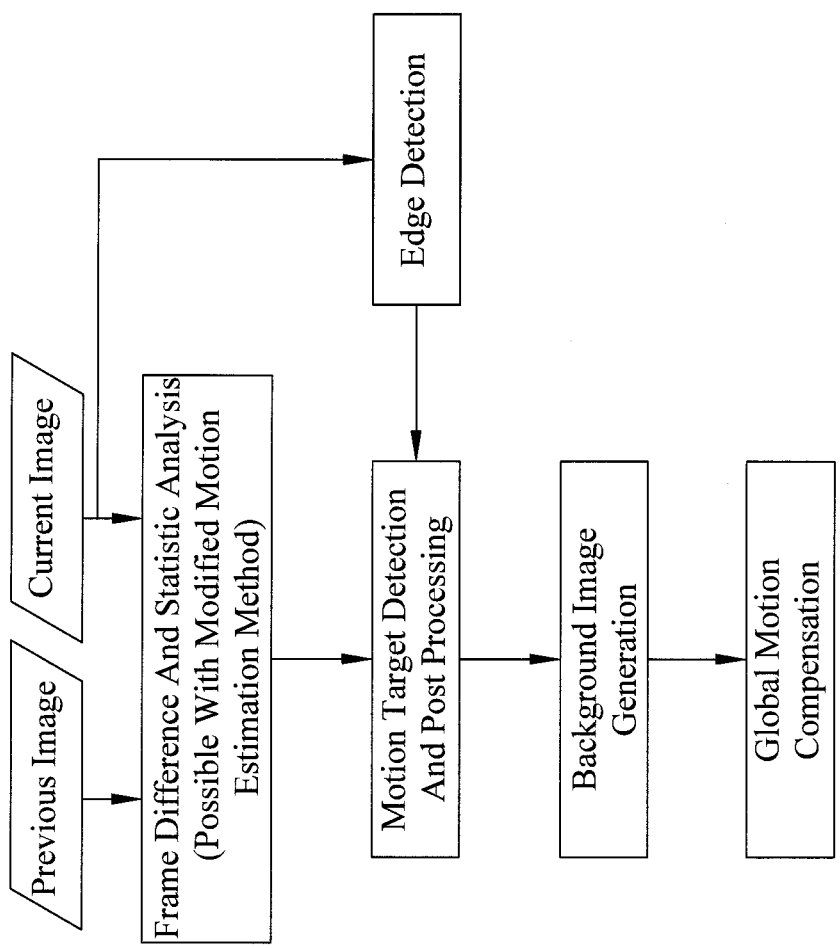
FIG. 2 shows a schematic view of an exemplary flowchart of a method for segmenting moving object in a video sequence.
Figure 3:
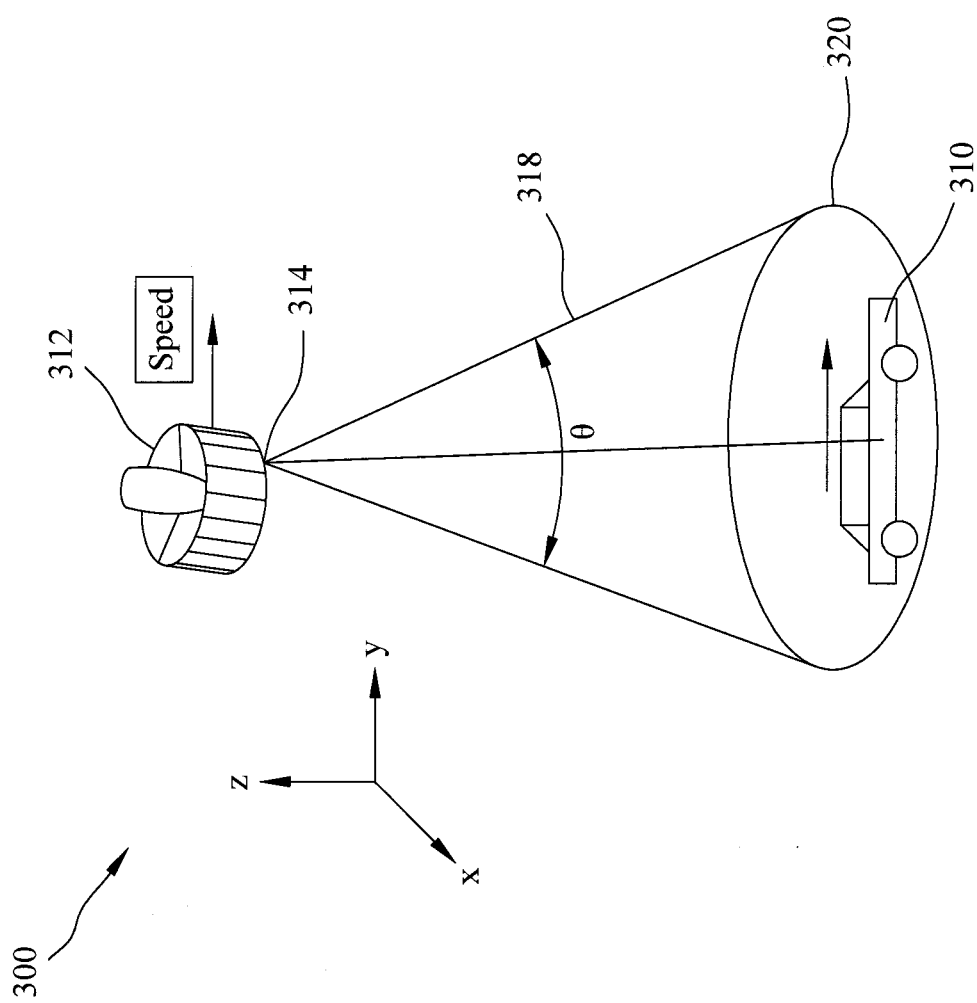
FIG. 3 shows an exemplary schematic view of an aerial tracking system.
Figure 4:
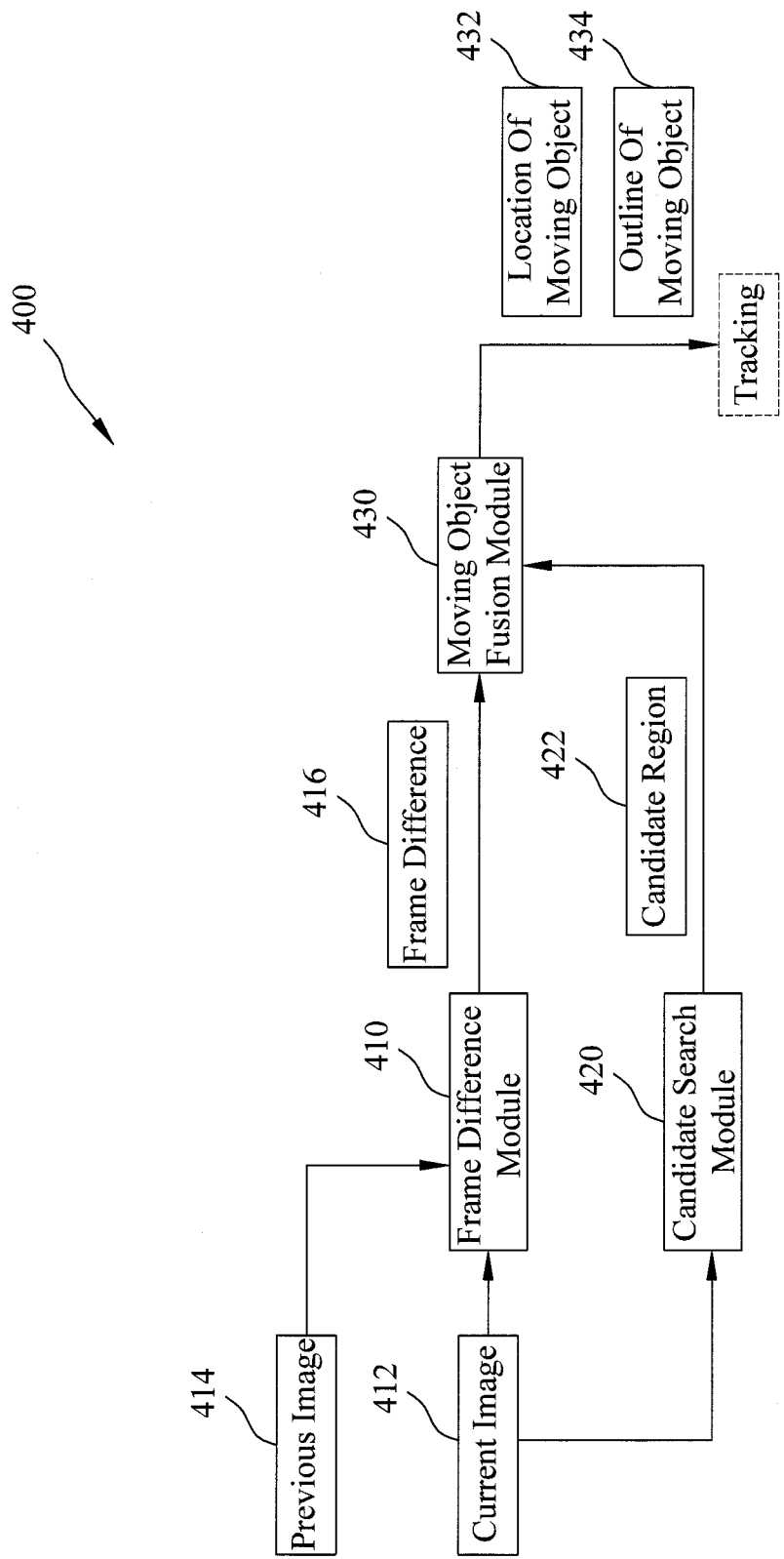
FIG. 4 shows an exemplary schematic view of an apparatus for moving object detection, consistent with certain disclosed embodiments.

FIG. 4 shows an exemplary schematic view of an apparatus for moving object detection, consistent with certain disclosed embodiments. In FIG. 4, moving object detection apparatus 400 comprises a frame difference module 410, a candidate search module 420 and a moving object fusion module 430.

Frame difference module 410 may target at two successive images, for example, a current image 412 and a previous image 414, of a moving object to compute a frame difference 416 corresponding to current image 412 and previous image 414, and transmits frame difference 416 to moving object fusion module 430. When current image 412 and previous image 414 are captured from two successive images of the moving object in motion, an image alignment module may be used to align previous image 414 to current image 412, and then frame difference module 410 computes the frame difference of the two aligned images.

Candidate search module 420 may segment inputted current image 412 into a plurality of homogeneous regions via an image segmentation technology, determine a plurality of uniform blocks from the segmented regions, and then detect at least a candidate region 422 from uniform blocks. Candidate region 422 is further transmitted to moving object fusion module 430.

Moving object fusion module 430 fuses frame difference 416 with at least candidate region 422, aided by a gradual morphing-based technology to obtain a location 432 and a complete outline 434 of the moving object.

When two successive images are captured from the moving object in motion, frame difference module 410 may find the characteristic points of the repeated region of two images, and compute the correspondence of the characteristic points of two images to align the two images. For example, frame difference module 410 may use corner points as characteristic points to compute the characteristic points and the correspondence of the characteristic points. The selection of characteristic points may start by observing a partial rectangular region of an image and moving slightly the rectangular region in different directions to understand the changes of the grayscale of the rectangular region. The changes of the grayscale of the rectangular region may be categorized into three conditions.

In the first condition, if the change of the grayscale of the moving image of this rectangular region is approaching flat, the grayscale of the rectangular region will not have obvious changes no matter in which direction the rectangular region moves. In the second condition, if the rectangular region moves in the image region of an edge or line, the grayscale will change drastically when the rectangular region moves in the direction of the edge or line versus in the direction perpendicular to the edge or line. In the third condition, if the rectangular region moves in the image region having characteristic points, moving in any direction will cause the strong grayscale change in the rectangular region. According to the three conditions, the total of the changes of the rectangular region in moving along every direction may be computed in a plurality of exemplary algorithms, such as, KLT algorithm representing the total in a 2*2 symmetric matrix Z. Then, two Eigen values $\lambda_1$ and $\lambda_2$ of matrix Z may be used to obtain the change of the grayscale of the rectangular region.

After finding the characteristic points of the image, the characteristic points are linked to the characteristic points of the previous image. All the characteristic points that are successfully linked are mostly fixed ground. Therefore, these characteristics may be used to collectively compute the motion mode of the ground to align the two successive images effectively.

Ideally, after image alignment, other than the ground moving objects, the static objects should stay at the same locations in current image and in previous image. At this point, the frame difference of the two successive images is the region of the moving object. However, in actual application, the accurate result cannot be obtained because of a wide range of various factors, such as, inaccurate image alignment computation, different object size due to camera zooming, different lighting conditions, noise of captured images, distorted images, and other random errors. These factors may cause great impact, such as, detecting incorrect moving object region caused by sudden change of object region, or impact on subsequent object tracking due to accumulated errors. These errors are all temporary and random. Therefore, frame difference module 410 may accumulate a plurality of frame differences in weighted manner via an accumulative error method.

Figure 5:
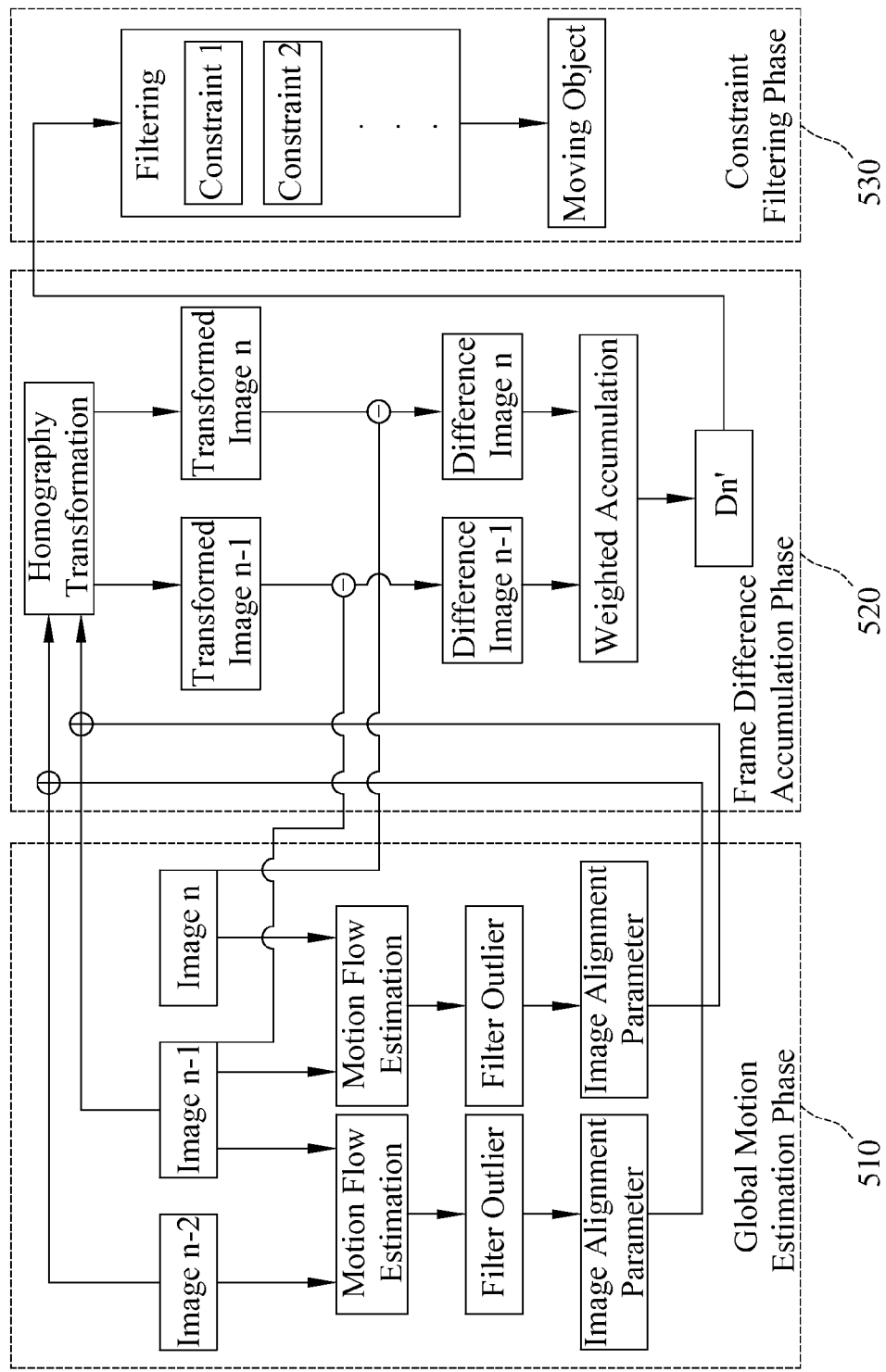
FIG. 5 shows an exemplary schematic view of computing frame difference, consistent with certain disclosed embodiments.

FIG. 5 shows an exemplary schematic view of computing frame difference, consistent with certain disclosed embodiments. In FIG. 5, the number of accumulated images with image difference is assumed to be 1 for ease of description. In global motion estimation phase 510, motion flow estimation and filtering outlier are performed on every two successive images to obtain image alignment parameter, and the alignment parameter is used to compute a homography transform matrix to obtain the transformed previous and current images, i.e., transformed image$_{n-1}$ and transformed image$_n$, n is greater than 1. In difference accumulation phase 520, subtraction is performed on transformed current and previous images, i.e., Frame difference image$_{n-1}$=(transformed image$_{n-1}$)−(image$_{n-2}$)

Frame difference image$_n$=(transformed image$_n$)−(image$_{n-1}$)

to obtain two frame difference images, marked as 522, 524. The accumulated frame difference may be obtained by a weighted sum of the accumulated frame difference image$_{n-1}$ and accumulated frame difference image$_n$. Let D as the difference image of the previous and current images, w as the predefined weight based on the application scene, and then the formula of accumulated difference image D may be expressed as follows:

$$D'_n = \sum_{k=n-N}^{k=n} w_k D_k,$$

where N is the number of accumulated difference images.

Frame difference module 410 may use the above formula to accumulate a plurality of frame difference images in weighted manner. For example, with accumulated three frame difference images, the weights may be defined as 0.2, 0.6 and 0.2 respectively. The three frame difference images may be multiplied with the respective weight, and then summed. The summed accumulated difference image may eliminate certain random noises.

However, some small noises may occur at the object edge in the image, for example, road sideline, tree trunk shadow, house edge, and so on. In addition, these noises are also fragmented, extending along the line, and so on. To filter these unreasonable noises, the geometry conditions may be used to provide further constraints, for example, the length-width ratio, area, range, to obtain detection result of the moving object based on difference image, as shown in constraint filtering phase 530 of FIG. 5. The setting and type of constraint conditions depend on the actual applied scene.

Figure 6:
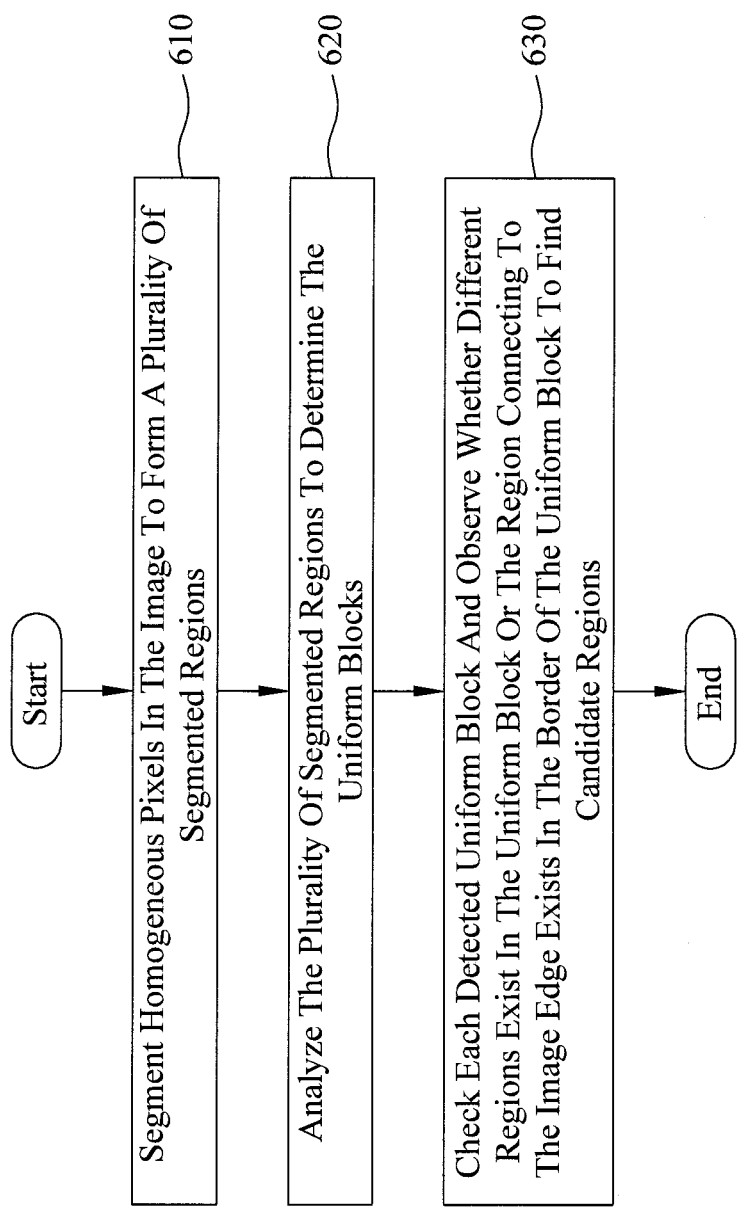
FIG. 6 shows an exemplary flowchart of detecting a candidate region, consistent with certain disclosed embodiments.

FIG. 6 shows an exemplary flowchart of the detection of candidate region by candidate search module 420, consistent with certain disclosed embodiments. In FIG. 6, homogeneous pixels in the images are segmented to form a plurality of segmented regions, as shown in step 610. Then, the segmented regions are analyzed to determine the uniform blocks, as shown in step 620. Then, in step 630, each detected uniform block is checked and observed whether different regions exist in the uniform block or the region connecting to the image edge exists in the border of the uniform block to find candidate region.

In step 610, it may use, for example, an image segment and label method based on region characteristic of pixels to realize the image segmentation and region labeling. In step 620, if the area of a segmented region is sufficiently large, the segmented region may be considered as a uniform block. If the area of the segmented regions is too small, the segmented region is considered as false positive and removed. In step 630, if different regions exist in a uniform block, these different regions are called inner regions. If the region connecting to the image edge exists in the border of the uniform block, because the region is about to enter to leave the field of view, this region is called cavity region. These inner regions and cavity regions are all candidate regions.

Figure 7A:
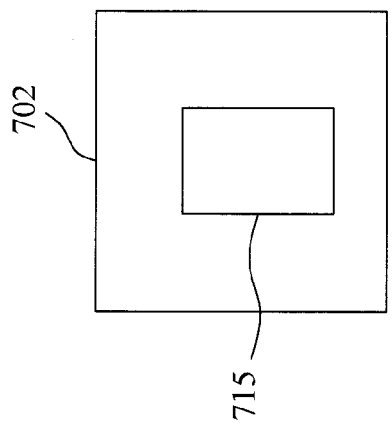
FIGS. 7A-7C show an exemplary schematic views of selecting candidate regions neighboring to image edges, consistent with certain disclosed embodiments.
Figure 7B:
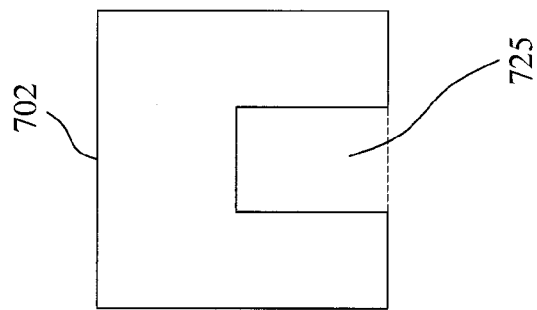
Figure 7C:
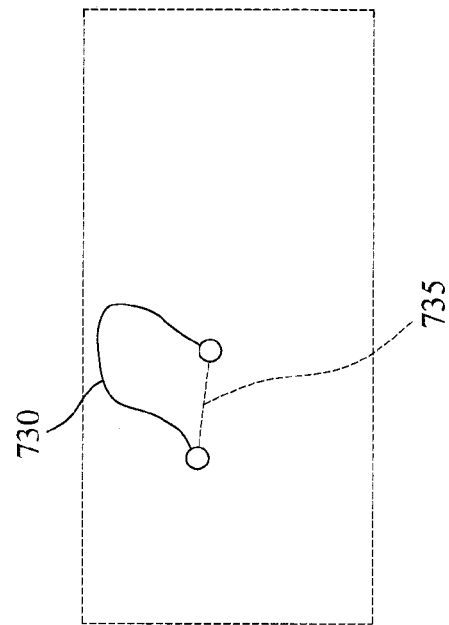

In other words, after obtaining uniform blocks, two types of regions may be selected. The first type is the regions included inside the uniform block, such as, an inner region 715 is included inside uniform block 702 in FIG. 7A. The other type is the region connected to both uniform block and image edge, such as, cavity region 725 in FIG. 7B. These two types of regions are both possible regions for moving object to appear. The contour distance and the real distance of the cavity region must be higher than a certain ratio to prevent candidate region with too small area. For example, in FIG. 7C, contour distance 730 of cavity region and real distance 735 must have a ratio higher than a threshold.

The moving object detected by frame difference module 410 using difference image mask usually only has greater response at the edge because of color and texture similarity; thus, only a partial moving object is obtained and the detected object is fragmented into a plurality of objects because of the broken fragmentations. For example, in FIG. 8A, actual object outline 805 is depicted as the dash line, while the object detected by difference image mask is fragmented into three objects 801-803. During the searching candidate process by candidate search module 420, a uniform block may include more than a real object. For example, in FIG. 8B, car 810 parking on road mark 815 makes the segmentation extending to the road mark. Therefore, candidate region 820 found by candidate search module 420 according to image segmentation may actually include more than a real object. These two examples disclose the factors that might cause false positive and erroneous moving object outline. Hence, moving object fusion module 430 merges the difference block in candidate region to fill the fragmented holes inside moving object, and by using gradual morphing-based repairmen, the complete location and outline of the moving object may be obtained.

Figure 9:
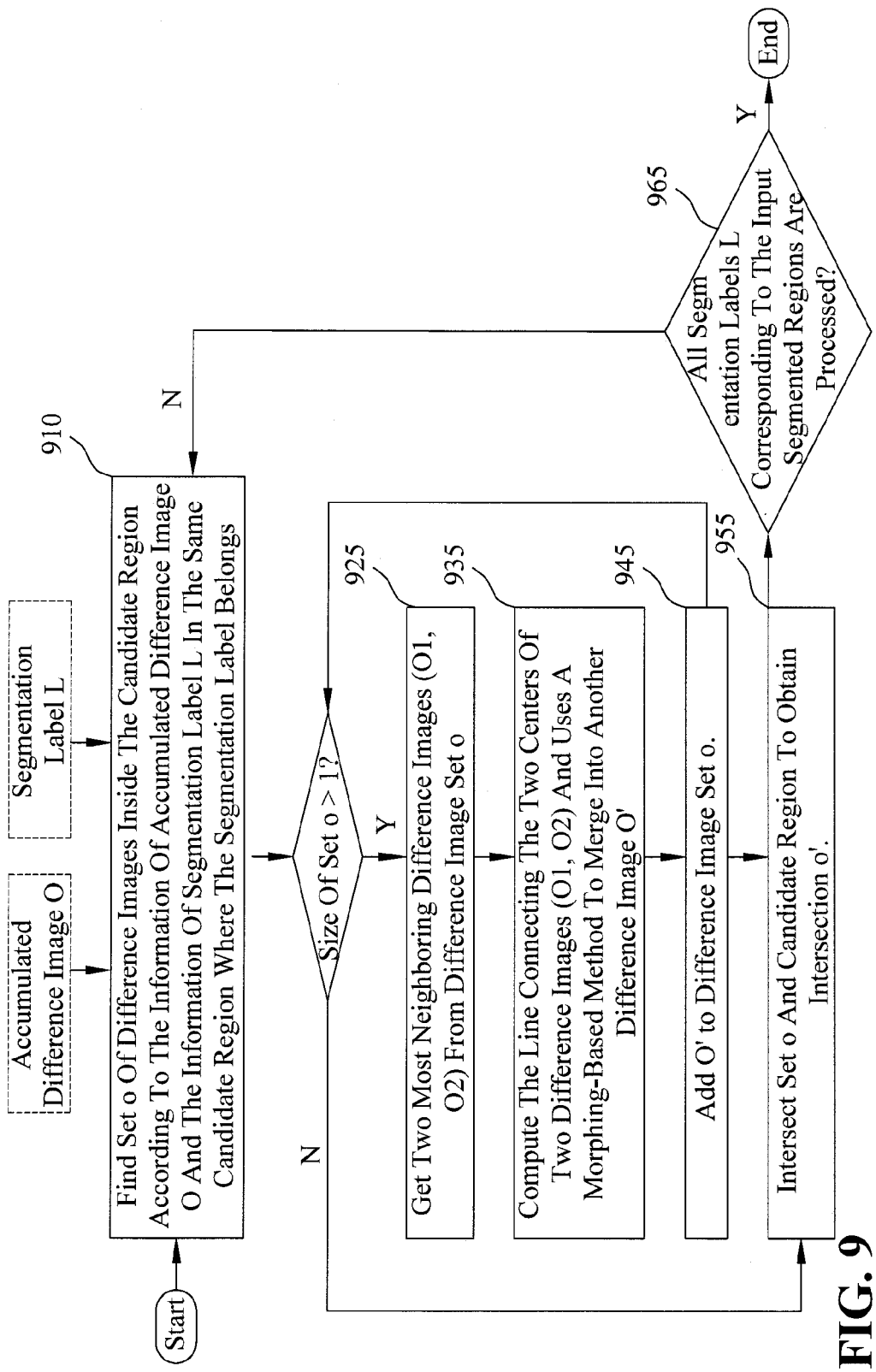
FIG. 9 shows an exemplary flowchart of merging image segmentation information and difference image information for object morphing, consistent with certain disclosed embodiments.

FIG. 9 shows an exemplary flowchart of merging image segmentation information and difference image information to perform object morphing, consistent with certain disclosed embodiments. Referring to FIG. 9, in step 910, it is to find set o of difference images inside the candidate region according to the information of accumulated difference image O and the information of segmentation label L in the same candidate region where the segmentation label belongs. If the number of the found difference images is greater than 1, it means that a plurality of fragmented object outlines exist in the candidate region. And these fragmented object outlines must be combined as a single object. Accordingly, first, step 925 is to get two most neighboring difference images ($O_1$, $O_2$) from difference image set o. Then, step 935 is to compute the line connecting the two centers of two difference images ($O_1$, $O_2$) and uses a morphing-based method to merge into another difference image O'. Step 945 is to add O' to difference image set o.

In this manner, the process continues to check whether more than one difference image exists in set o. If so, repeat steps 925, 935, 945; otherwise, step 955 is to intersect set o and candidate region to obtain intersection o'. Intersection o' is the moving object with complete outline. In step 945, the morphing-based method used to compute intersection o' may select different morphing technique according to the actual application to gradually fill the fragmented holes inside detected object until all segmentation labels L corresponding to the input segmented regions are processed, as shown in step 965.

In step 925, it may also obtain at least two most neighboring difference images from difference image set o. Then, in step 935, it may use a morphing method to merge the at least two difference images into another difference image O' along the line connecting the centers of the at least two difference images.

Figure 10:
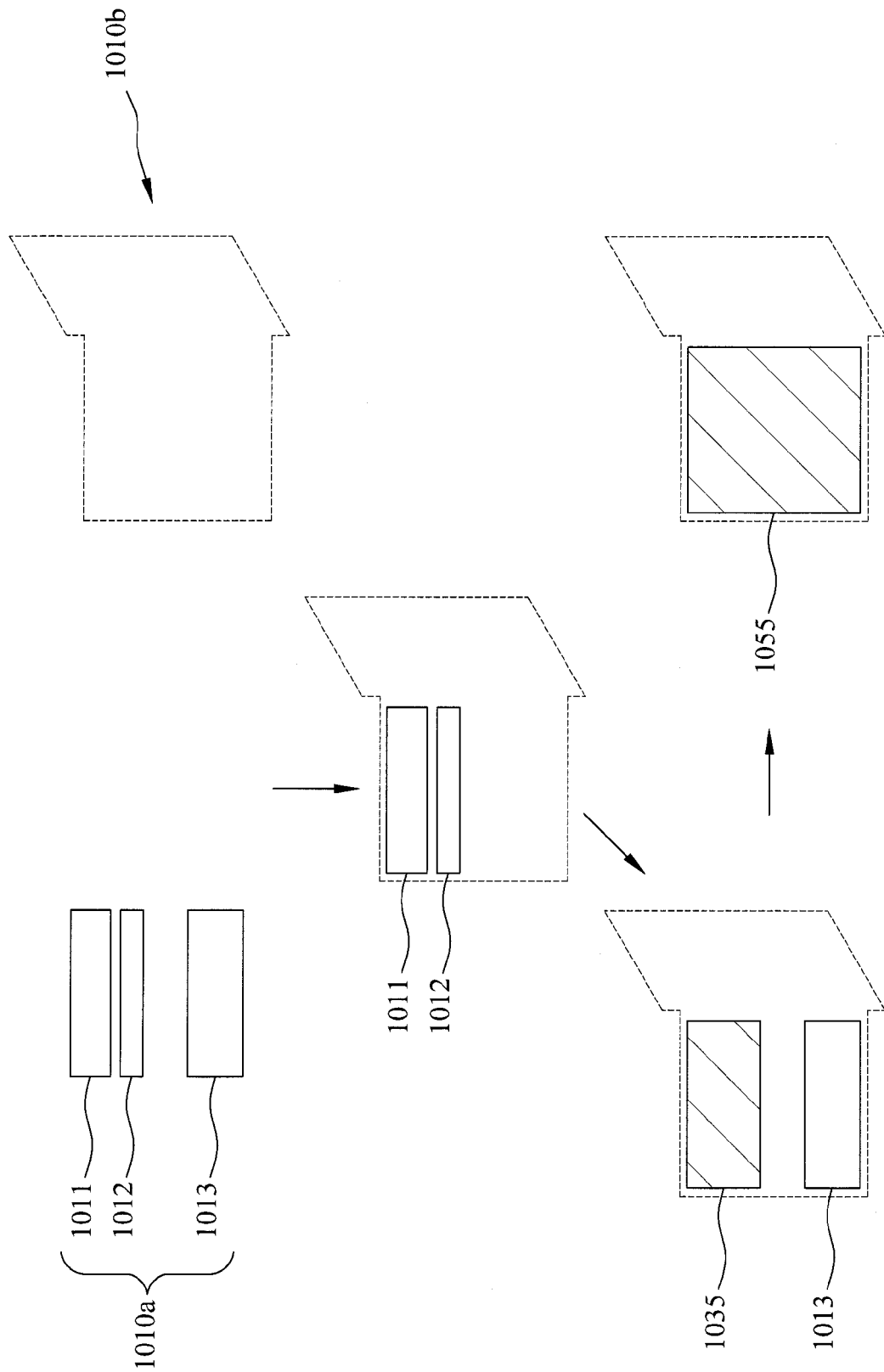
FIG. 10 shows an exemplary schematic view of the result of FIG. 9, consistent with certain disclosed embodiments.

FIG. 10 uses an exemplar to describe the results of steps 910, 925, 935, 945 and 955, consistent with certain disclosed embodiments. Referring to FIG. 10, from step 910, difference image set marked as 1010a formed by three difference images 1011-1013 in candidate region 1010b where a segmentation label belongs to is obtained. From step 925, two most neighboring difference images 1011, 1012 are got. From step 935, morphing is performed to merge difference images 1011, 1012 into another difference image 1035. From step 945, difference image set includes difference images 1013, 1035. Repeat steps 925, 935, 945 until the difference image set includes only one final merged difference image 1055, i.e., the intersection of difference image set and candidate region 1010b. In other words, originally, three fragmented object outlines existing in candidate region 1010b are gradually merged by morphing into a single object outline.

Figure 11:
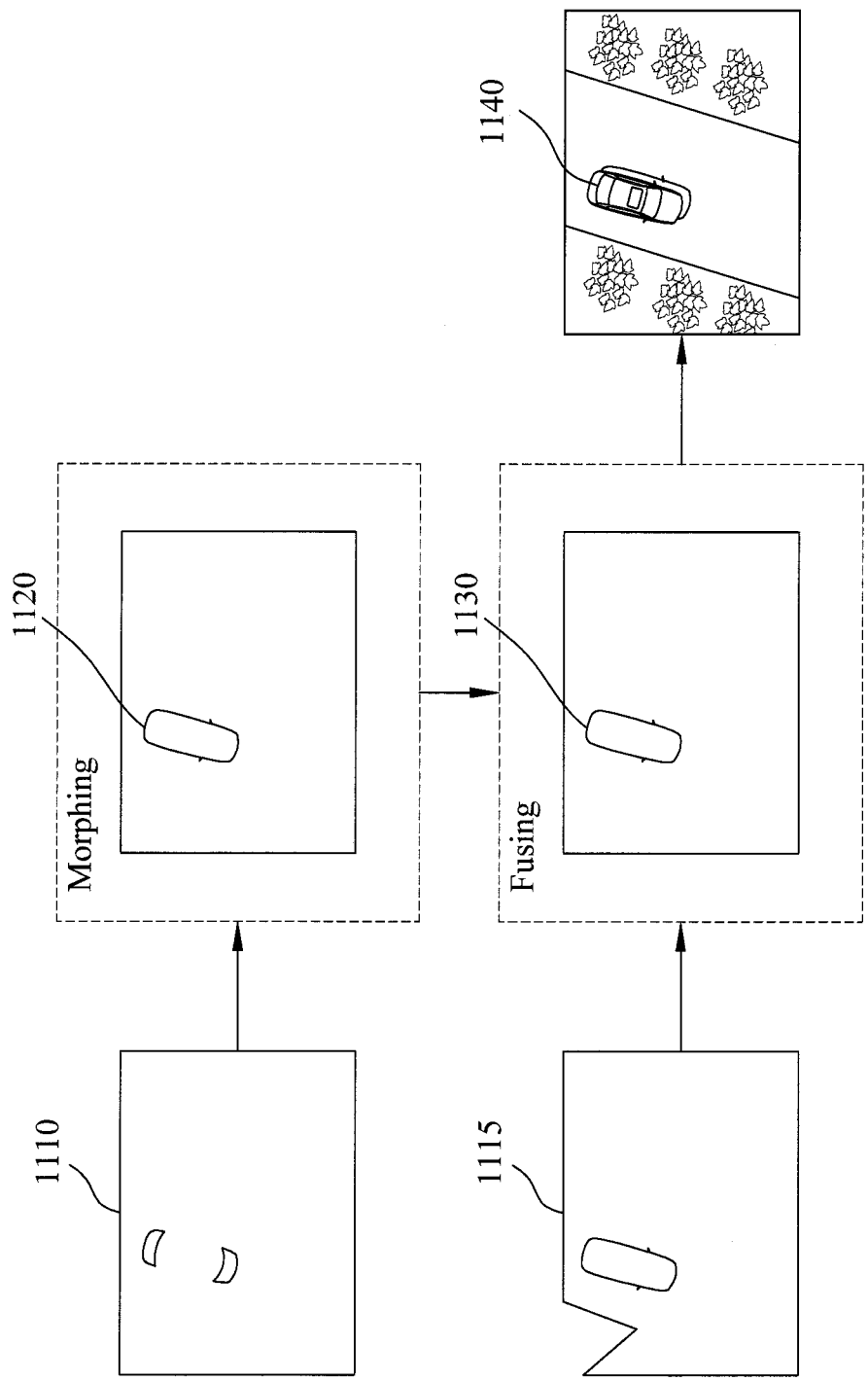
FIG. 11 shows an exemplary schematic view of the result of morphing and fusing by moving object fusion module, consistent with certain disclosed embodiments.

Moving object fusion module 430 may include a morphing module and a fusion module. Take FIG. 11 as an example, morphing module may select difference image mask 1110 in the moving object candidate region and uses a gradual morphing technique to merge into a single object 1120 for transmitting to the fusion module. As aforementioned, difference image mask 1110 is a difference image mask obtained by a frame difference method used by frame difference module 410. Fusion module may fuse candidate region 1115 and single object 1120 generated by morphing module to obtain complete outline 1130 of moving object 1140. As aforementioned, candidate 1115 is the candidate region selected by candidate search module 420 from uniform block after segmentation.

The aforementioned gradual morphing is the process of generating a plurality of successive and smooth intermediate images generated by image interpolation between source image and destination image. The disclosed exemplary embodiment is fusing the above frame difference and the candidate region to generate a moving object mask with reasonable and complete outline through gradual morphing. FIG. 12 and FIG. 13 use the exemplar of FIG. 11 to describe the process used in the disclosed exemplary embodiments.

Figure 13C:
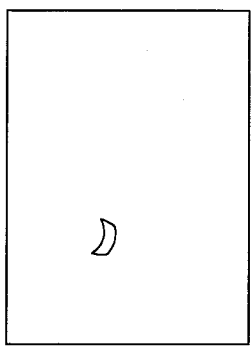
FIGS. 13A-13F show exemplary results corresponding to the union of source image and each morphing intermediate image, consistent with certain disclosed embodiments.
Figure 13F:
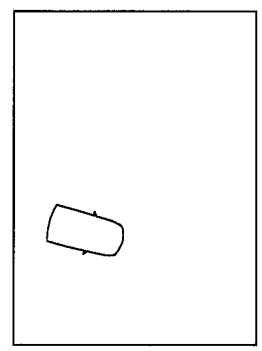
Figure 13B:
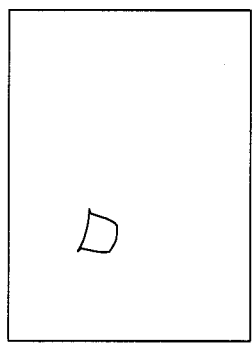
Figure 13E:
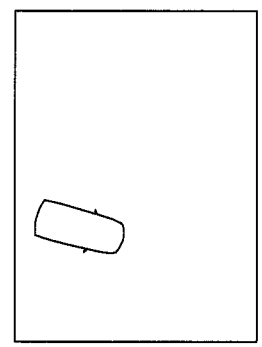
Figure 13A:
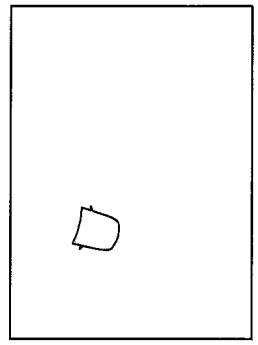
Figure 13D:
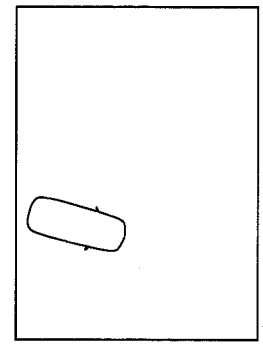

FIG. 12A and FIG. 12F are schematic view of source image and destination image respectively, while FIGS. 12B-12E are schematic views of intermediate images generated by gradual morphing. The complete outline of the object may be obtained by obtaining union of the above source image and the entire intermediate images of the morphing process. FIG. 13 shows the corresponding result of obtaining union of source image and each morphing intermediate image, where FIG. 13A is the source image, FIG. 13B is the union of source image and all the intermediate images up to FIG. 12B, and so on. Similarly, FIG. 13F shows the union of images generated by the morphing process. That is, the result generated by morphing module, i.e., single object 1120 of FIG. 11.

Figure 14:
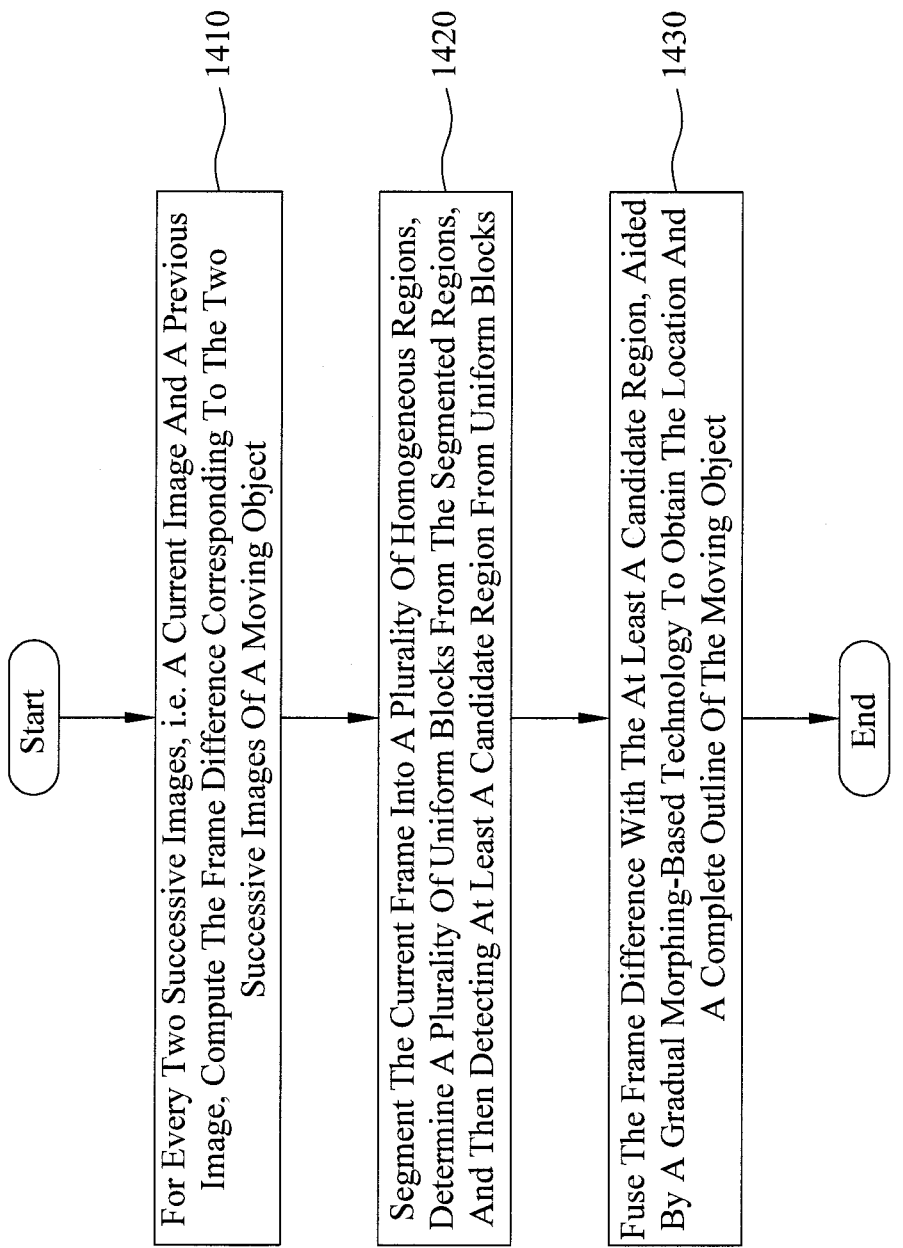
FIG. 14 shows an exemplary flowchart of a method for moving object detection, consistent with certain disclosed embodiments.

FIG. 14 shows an exemplary flowchart of a method for moving object detection, consistent with certain disclosed embodiments. Referring to FIG. 14, for every two successive images, i.e. a current image and a previous image, it may compute the frame difference corresponding to the two successive images of a moving object, as shown in step 1410. In step 1420, the current frame is segmented into a plurality of homogeneous regions, a plurality of uniform blocks is determined from the segmented regions, and then at least a candidate region from uniform blocks is detected. Then, the frame difference is fused with the at least a candidate region, aided by a gradual morphing-based technology to obtain the location and a complete outline of the moving object, as shown in step 1430.

The disclosed exemplary embodiments of apparatus and method for moving object detection use image segmentation technology to label independent objects and morphing technique to obtain a complete object outline, and is applicable to detecting a plurality of moving objects as well as finding moving object of interest through motion detection. The disclosed exemplary embodiments may also be applicable to camera with non-specific motion path. Because the disclosed exemplary embodiments select candidate regions from segmented uniform blocks and gradual morphing computation, they may also be applicable to ground moving object detection in aerial successive images to meet the requirements of real-time computation.

Figure 15:
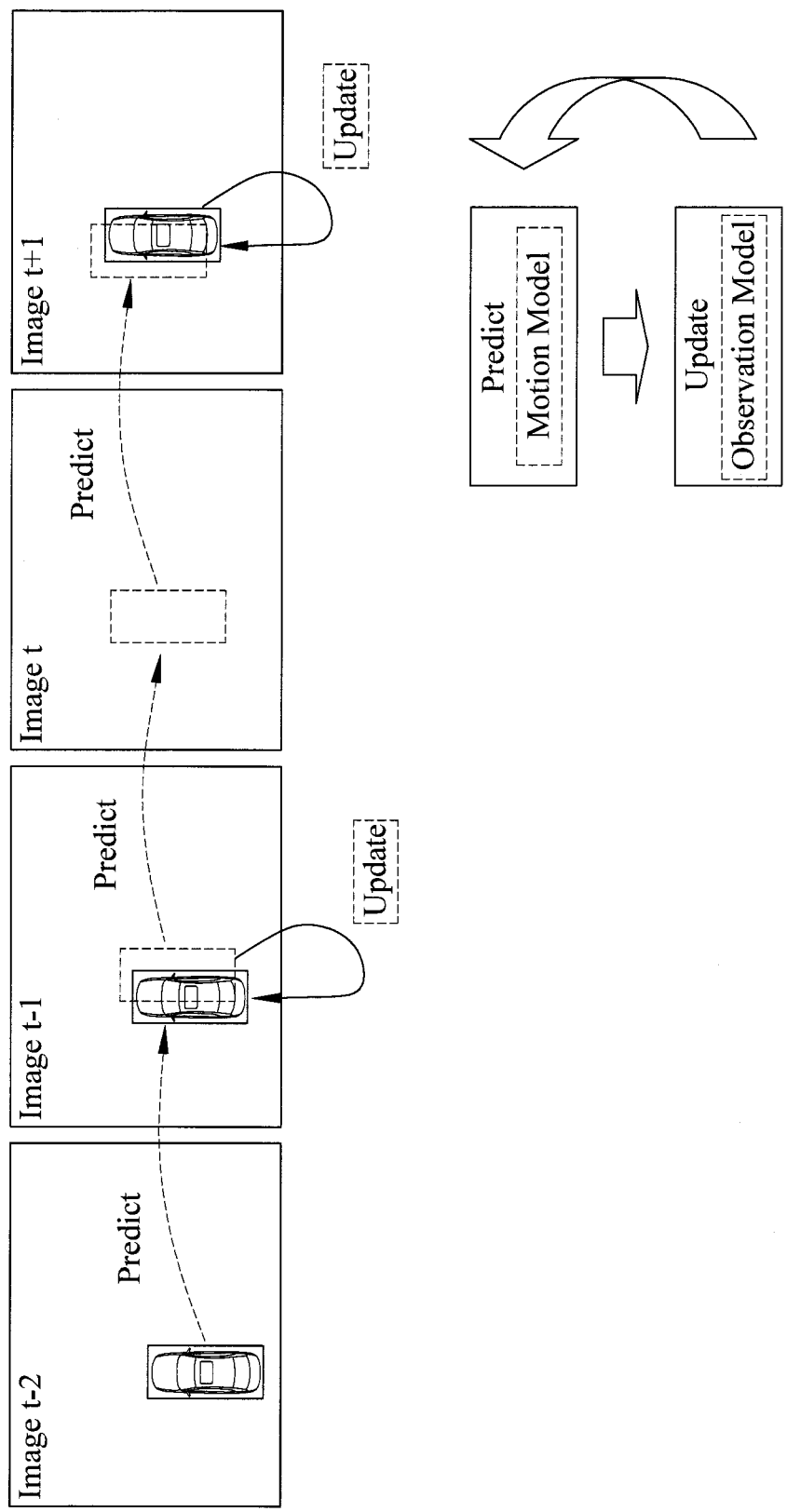
FIG. 15 shows an exemplary schematic view illustrating how the motion model and observation model continuously predict and update the state of moving object to accomplish moving object tracking, consistent with certain disclosed embodiments.

The aforementioned exemplary embodiments may further include object tracking to predict, compensate and update the location of moving object. Therefore, apparatus 400 for moving object detection of FIG. 4 may further include a moving object tracking module or add the moving object tracking module after moving object fusion module 430 for inputting the location and the complete outline of the moving object into the moving object tracking module to predict, compensate and update the location of the moving object. In the exemplary flowchart of FIG. 9, after executing step 965, i.e., when all segmentation labels L corresponding to inputted segmented regions are processed, the information on the location and the complete outline of the moving object may be inputted into the moving object tracking module to predict, compensate and update the location of the moving object Moving object tracking may be translated into an inference problem for solving, for example, based on Bayesian theory, given the prior probability of the state of tracked object, to find the posterior probability of the state after obtaining new measurement. This theory is to define a motion model and an observation model of the moving object and, with these two models, to treat the moving object tracking as (1) based on measurement prior to time t to predict the state at time t+1, and (2) based on measurement at time t+1 to update the prediction. As shown in FIG. 15, the moving object, such as, a car, through the repetition of (1) and (2) to continuously predict and update the state of the moving object to accomplish moving object tracking.

The motion model of the above moving object may be expressed with the following equation:

$$x_{t+1}=A_t x_t + V_t$$

where $\{x_t\}, t=1, 2, \ldots$ is the state vector of the moving object, t is the discrete time sequence, A is the state transition function, indicating the motion model of the moving object from time t to time t+1, and V is the accompanying noise in the moving process. The observation model of the moving object may be expressed as the following equation:

$$z_t = H_t x_t + W_t$$

where $\{z_t\}, t=1, 2, \ldots$ is the observed characteristic vector of the moving object, H is the measurement transition function, indicating the transition relation between the object state and the measured characteristic vector, and W is the accompanying noise in the measurement.

In the framework of the above moving object tracking, the exemplary embodiments may use a filter, such as, Kalman filter, to perform prediction and update for a moving object. Assumed that the state vector of a moving object is set as x={x y w h $v_x$ $v_y$}, where $v_x$ and $v_y$ are the velocity in the x and y direction respectively. With respect to the above motion model and observation model, noises are expressed in Gauss function, as V=N(0,$\sigma_a^2$) and W=N(0,$\sigma_z^2$) and transition function A may be expressed as a 6*6 unit matrix, measurement transition function may be expressed as the following matrix H:

$$H = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \end{bmatrix}$$

When system state transition function A and measurement transition function H have a linear relation, and state transmission noise V and measurement noise W both satisfy Gaussian model, the filter, such as, Kalman filter, may be used to solve the posterior probability. If A and H do not have a linear relation, an extended Kalman filter may still be used to solve and the posterior probability still satisfies Gaussian distribution. The posterior probability of actual visual tracking problem is usually non-linear, non-Gaussian and multi-modal. In that case, particle filter may be used to solve the problem.

The exemplary embodiments may use the aforementioned moving object tracking technique to detect the moving object in the monitored frame and then uses a minimum surrounding rectangle O=[x y w h]$^T$ to describe the object, where x and y are the x and y coordinate of the center in the frame, while w and h are the width and height. Assumed that at time t, the foreground obtained by moving object detection includes a list of n moving object rectangles C={$O_i^t$|i=1, 2, ..., n}, and the hypothesis list of tracked m moving objects by system at time t−1 and prior M={$T_j^t$|i=1, 2, ..., m}, where T is the correlated τ moving object rectangles considered as the same object in continuous tracking, i.e., T={$O^{t-\tau}$, $O^{t-\tau+1}$, ..., $O^t$, ρ}, where $O^{t-\tau}$ is the first appearing minimum surrounding rectangle of the moving object, and so on, and ρ is called a confidence index. The value of confidence index will increase or decrease according to the success or failure of object tracking. When the confidence index is larger than an upper threshold, the hypothesis is considered as sufficient confidence, and the hypothesis is translated into a physical moving object. On the other hand, if the confidence index is lower than zero, the moving object is considered having left the monitored scene and the hypothesis may be removed from the list maintained by the tracker of the system.

In the exemplary embodiments, the moving object tracking module may maintain a tracker with two lists. The first list is the current moving object list and the second list is the hypothesis list of the moving object tracked at previous time.

Figure 16:
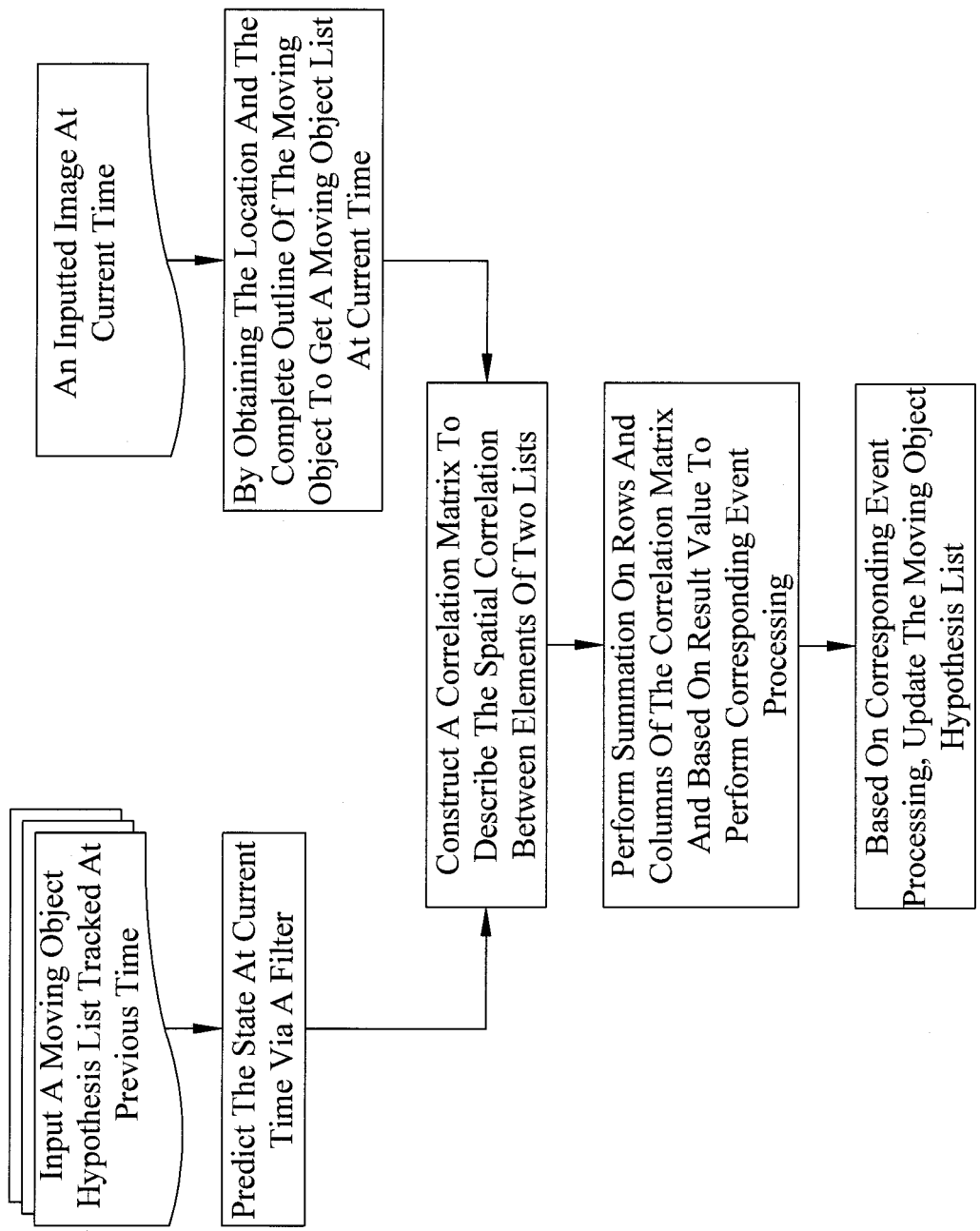
FIG. 16 shows an exemplary flowchart of moving object tracking, consistent with certain disclosed embodiments.

FIG. 16 shows an exemplary flowchart of moving object tracking, consistent with certain disclosed embodiments. In FIG. 16, on one hand, the system maintains the moving object hypothesis list tracked at previous time. The lists records the hypothesis of m moving objects tracked at previous time, and then a filer, such as, as Kalman filter, is used to predict the state at the current time. On the other hand, for the current inputted image, the current moving object list may be obtained through moving object detection. This list records n foreground object rectangles. Consider the spatial correlation of the elements in these two lists, and a correlation matrix may be constructed. Element (i, j) of the correlation matrix represents the spatial correlation between foreground object rectangle i and moving object hypothesis j. If the two has spatial overlapping, the element is set as 1; otherwise, the element is set as 0. The columns and the rows of the correlation matrix are summed up, and corresponding processing is executed based on the result. The result may reflect the addition, disappearing or steady tracking of the moving object, and the merging or splitting among a plurality of moving objects. Then, based on the corresponding processing, the moving object hypothesis list is updated. The behavior of each corresponding processing is described as follows.

Steady tracking: when a moving object hypothesis only maps to a foreground object, the object is in the state of steady tracking. At this point, the foreground object rectangle may be used as measurement of Kalman filter and update, and the confidence index is increased.

Splitting: when a moving object hypothesis maps to a plurality of foreground objects, the object is split into two objects. At this point, the foreground object rectangle with the largest overlapping area is used as the measurement to update the moving object hypothesis, and a new moving object hypothesis is added to represent all the other foreground object rectangles, and used as the initial state of the moving object.

Merging: when a plurality of moving object hypothesis maps to a foreground object, a plurality of moving objects is merged as an object. At this point, a template comparison technique is used to map the moving object template to the foreground object.

Disappearing: when a moving object hypothesis cannot map to foreground object rectangles, the object disappears from the monitored scene. At this point, the confidence index of that hypothesis should be decreased.

Addition: when a foreground object rectangle cannot correlate to any moving object hypothesis, the foreground object rectangle is a newly added object. Hence, a new moving object hypothesis is added according to the state.

FIG. 17A shows a schematic view of an exemplary correlation matrix between moving object hypothesis and foreground detection rectangle, consistent with certain disclosed embodiments. Let O_1 to O_n represent n foreground object rectangles, and T_1 to T_m represent m moving object hypotheses. After the summation operation of the rows and the columns of the correlation matrix, the value is recorded in the last row (CM_r) and last column (CM_c). FIG. 17B shows a schematic view of an exemplary correlation matrix and event analysis processing, consistent with certain disclosed embodiments. As shown in FIG. 17B, the correlation values of CM_r and CM_c reflect the addition, disappearing, steady tracking of a corresponding moving object, and the merging and splitting among a plurality of moving objects.

The disclosed method for moving object detection of the exemplary embodiments may be embodied in a computer program product, such as, a representative computer, but the scope of the exemplary embodiments is not limited to this computer or any type of computer. The representative computer may include, for example, at least a processor, at least a storage device and at least a memory. The processor may be a digital processing apparatus, the storage device may be a storage device accessible by a digital processing apparatus, and the memory may be read only memory (ROM) or random access memory (RAM).

Figure 18:
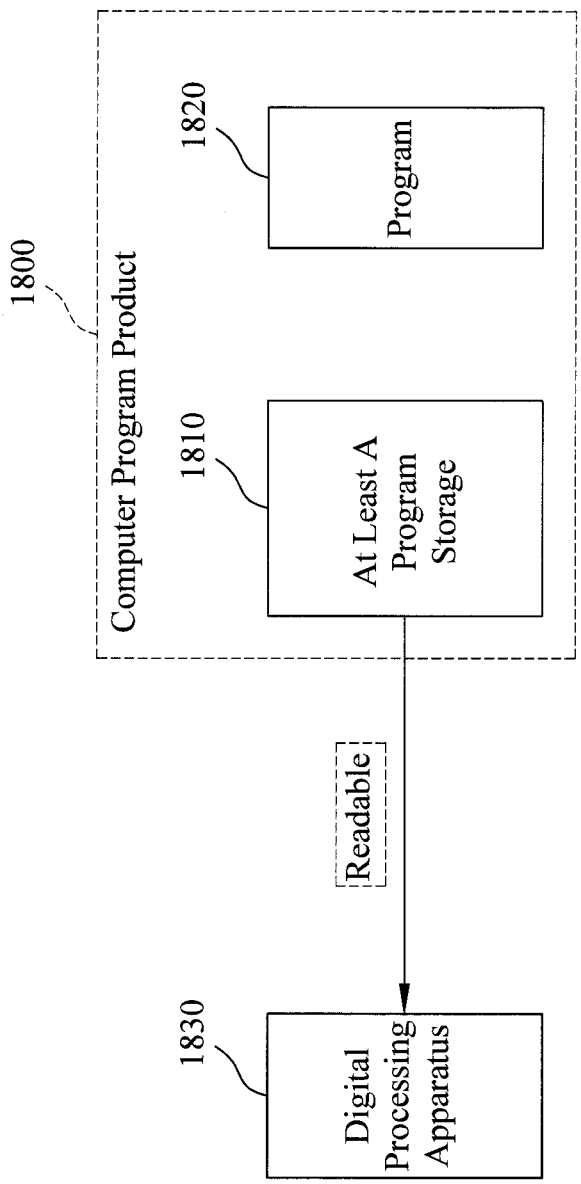
FIG. 18 shows an exemplary schematic view of a computer program product, consistent with certain disclosed embodiments.

FIG. 18 shows an exemplary schematic view of a computer program product, consistent with certain disclosed embodiments. Computer program product 1800 may comprise a program storage 1810 and a program of instructions 1820. Program storage 1810 may be a storage accessible by a digital processing apparatus 1830. Program of the instructions 1820 may be tangibly embodied in program storage 1810 and may be executed in digital processing apparatus 1830 to perform the steps 1410, 1420, 1430 of the moving object detection method of the present invention. Program storage 1810 may be of many types, such as, hard disk, memory, optical disk, or any computer-readable media.

As aforementioned, the moving object detection method may further include the use of a motion model and an observation model of the moving object to continuously predict and update the state of the moving object to track the object. The details of the moving object detection method are omitted here.

Computer program product 1800 may further include or connect to a moving object tracking module to predict, compensate and update the location of the moving object. Computer program product 1800 may also connect to at least a peripheral device to operate, such as, a monitor. The monitor can, for example, display the location and the complete outline of the moving object detected in the monitored area.

In summary, the apparatus and method for moving object detection of the exemplary embodiments computes a corresponding frame difference for every two successive image frames of a moving object, and segments a current image frame of the two successive image frames into a plurality of homogeneous regions. At least a candidate region is further detected from the plurality of homogeneous regions. The system gradually merges the computed frame differences via a morphing-based technology and fuses the merged frame difference with the at least a candidate region, thereby obtaining the location and a complete outline of the moving object. The exemplary embodiments may further include a moving object tracking technique to predict, compensate and update the moving object location. The exemplary embodiments may be applicable to many different scenes, such as, road traffic monitoring, suspicious vehicle tracking, illegal gravel mining, smuggling and land surveillance, coastline patrol and surveillance, and so on.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for moving object detection, comprising:
    a frame difference module, for each two successive images of a moving object, computing a frame difference corresponding to said two successive images, said two successive images being a current image and a previous image respectively;
    a candidate search module, segmenting inputted said current image into a plurality of homogeneous regions, determining a plurality of uniform blocks from said plurality of homogeneous regions, and then detecting at least a candidate region from said plurality of uniform blocks; and
    a moving object fusion module, fusing a plurality of frame differences with said at least a candidate region, aided by a gradual morphing-based technique to obtain a location and a complete outline of said moving object.

2. The apparatus as claimed in claim 1, wherein said moving object fusion module further includes:
    a morphing module, said morphing module selecting a candidate region difference image mask of said at least a candidate region of said moving object, and merging said plurality of frame differences into a single object through said gradual morphing-based technique; and a fusing module, said fusing module fusing said at least a candidate region and said single object generated by said morphing module, thereby obtaining said complete outline of said moving object.

3. The apparatus as claimed in claim 1, wherein two types of regions are selected from said plurality of uniform blocks; one type is regions included inside said plurality of uniform blocks, and the other type is regions in surrounding areas of said plurality of uniform blocks connecting to image edges.

4. The apparatus as claimed in claim 1, wherein said moving object fusion module generates a plurality of successive and smooth intermediate images between a source image and a destination image through said gradual morphing-based technique.

5. The apparatus as claimed in claim 4, wherein said complete outline of said moving object is a union result of said source image and all intermediate images of said gradual morphing-based technique.

6. The apparatus as claimed in claim 1, wherein said frame difference generated by said frame difference module is an accumulated difference image accumulated by a plurality of difference images.

7. The apparatus as claimed in claim 1, wherein said apparatus further includes a moving object tracking module to predict, compensate and update said location of said moving object.

8. The apparatus as claimed in claim 7, wherein said moving object tracking module continuously predicts and updates a state of said moving object to achieve moving object tracking, through a motion model and an observation model of said moving object.

9. The apparatus as claimed in claim 7, wherein said moving object tracking module maintains a tracker, and said tracker has a moving object list at a current time and a moving object hypothesis list having been tracked at a previous time.

10. The apparatus as claimed in claim 1, wherein said apparatus further includes an image alignment module, and when said two successive images are captured from said moving object in motion, said image alignment module first aligns said previous image to said current image, and then said frame difference module computes said frame difference of the aligned said previous image and said current image.

11. A method for moving object detection, applicable to an apparatus for moving object detection, said method comprising:
for each two successive images of a moving object, computing a frame difference corresponding to said two successive images, said two successive images being a current image and a previous image respectively;
segmenting said current image into a plurality of homogeneous regions, determining a plurality of uniform blocks from said plurality of homogeneous regions, and then detecting at least a candidate region from said plurality of uniform blocks; and
fusing a plurality of frame differences with said at least a candidate region through a moving object fusion module, and aided by a gradual morphing-based technology to obtain a location and a complete outline of said moving object.

12. The method as claimed in claim 11, wherein said fusing a plurality of frame differences with said at least a candidate region, and aided by a gradual morphing-based technology further includes:
based on information of at least an accumulated difference image and at least a segmentation label, finding a difference image set falling inside a candidate region where said at least a segmentation label belongs to;
if a number of difference images in said difference image set is greater than 1, selecting two most neighboring difference images from said difference image set and using a morphing technique to merge said two most neighboring difference images into another difference image, adding said another difference image to said difference image set, and obtaining intersection of said difference image set and said candidate region; and
repeating above steps until all inputted segmentation labels corresponding to all of said plurality of homogeneous regions are processed.

13. The method as claimed in claim 11, wherein said detecting at least a candidate region from said plurality of uniform blocks further includes:
checking each of said plurality of uniform blocks, observing whether different regions exist inside said plurality of uniform blocks, or regions in surrounding of said plurality of uniform blocks connecting image edges to find said at least a candidate region.

14. The method as claimed in claim 11, wherein said frame difference is an accumulated difference image accumulated by a plurality of difference images in a weighted manner.

15. The method as claimed in claim 12, wherein said morphing technique generates a plurality of successive and smooth intermediate images between a source image and a destination image by using an interpolation method.

16. The method as claimed in claim 13, wherein a ratio of a contour distance and a real distance of a region in said surrounding of said plurality of uniform blocks connecting an image edge is higher than a threshold.

17. The method as claimed in claim 11, wherein said method further including:
through a motion model and an observation model, continuously predicting and updating a state of said moving object for further tracking said moving object.

18. The method as claimed in claim 17, wherein said moving object tracking further includes:
inputting a moving object hypothesis list tracked at a plurality of previous times, and predicting a state at a current time via a filter;
for an inputted image at said current time, obtaining a moving object list at said current time by said location and said complete outline of said moving object;
constructing a correlation matrix to describe a spatial correlation between elements of said moving object hypothesis and said moving object lists;
performing summation on rows and columns of said correlation matrix, and performing corresponding event processing according to an output value of said summation; and
based on said corresponding event processing, updating said moving object hypothesis list.

19. The method as claimed in claim 18, wherein said moving object hypothesis list records a plurality of moving object hypotheses tracked at said plurality of previous times, and said moving object list records a plurality of foreground object rectangles at said current time.

20. The method as claimed in claim 18, wherein said output value of said summation of rows and columns of said correlation matrix reflects one of events at least including addition, disappearing, steady tracking of a corresponding moving object, and merging and splitting among a plurality of moving objects.

21. A computer program product, comprising:
- at least a program storage formed by non-transitory computer-readable medium, readable by a digital processing apparatus; and
- a program of a plurality of instructions, tangibly embodied in said at least a program storage and executable by said digital processing apparatus to perform a moving object detection method, said method comprising:
- for each two successive images of a moving object, computing a frame difference corresponding to said two successive images, said two successive images being a current image and a previous image respectively;
- segmenting said current image into a plurality of homogeneous regions, determining a plurality of uniform blocks from said plurality of homogeneous regions, and then detecting at least a candidate region from said plurality of uniform blocks; and
- fusing a plurality of said frame differences with said at least a candidate region through a moving object fusion module, and aided by a gradual morphing-based technology to obtain a location and a complete outline of said moving object.

22. The computer program product as claimed in claim 21, wherein said computer program product is further connected to a moving object tracking module for predicting, compensating and updating said location of said moving object.

23. The computer program product as claimed in claim 21, wherein said moving object detection method further includes:
- through a motion model and an observation model, continuously predicting and updating a state of said moving object for further tracking said moving object.

* * * * *